Inventor
Thomas Olinger
By Frank E. Livrance Jr.
Attorney

Patented Dec. 28, 1926.

1,612,309

UNITED STATES PATENT OFFICE.

THOMAS OLINGER, OF HOLLAND, MICHIGAN, ASSIGNOR TO FEDERAL MANUFACTURING COMPANY, OF HOLLAND, MICHIGAN, A CORPORATION OF MICHIGAN.

DAMPER.

Application filed August 3, 1925. Serial No. 47,696.

This invention relates to a damper adapted to be used primarily in the hot air pipes of furnaces. It is the main object and purpose of the present invention to make a damper which is fully reversible in all respects, that is, which can be placed within the furnace pipe without regard to which side of the damper comes adjacent a particular opening therethrough and without regard to the side of the pipe through which the damper pin or rod may pass, the same being adapted for connection to the damper inside of the pipe irrespective in which side of the pipe it is inserted. A further object of the invention is to make a novel construction of damper pin or rod with engaging devices to engage with the damper struck directly from the sides of the pin or rod itself and formed as an integral part thereof. A still further object of the invention is to construct the damper complete in the simplest and most economical manner whereby the damper may be produced at a very low cost of manufacture.

These various objects and purposes together with others not at this time particularly stated will be apparent as understanding of the invention is had from the following description taken in connection with the accompanying drawing, in which, Fig. 1 is an elevation of the damper assembled in the furnace pipe, said pipe being shown in cross section.

Like reference characters refer to like parts in the different figures of the drawing.

Figure 3:
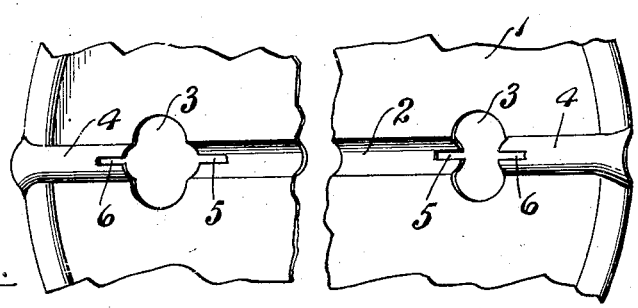
Fig. 3 is a fragmentary perspective view of the damper disk, showing particularly the middle portion thereof.

The damper disk 1 is made from sheet metal and is circular in outline, being provided with various grooves or embossings for the purpose of strengthening the same. Said disk along a diameter of the same is formed with an elongated grooved portion 2 reaching from the center of the disk in each direction to openings 3 which are made through the disk a short distance inward from each side thereof. From the opposite sides of said openings to the edges of the disk other grooved portions 4 are made, pressed in the disk opposite to the direction in which the portion 2 is pressed. At each end of the groove 2 short slots 5 are cut and similarly at the inner end of each of the grooves 4 like slots 6 are cut in alignment with the slots 5, as best shown in Fig. 3.

Figure 4:
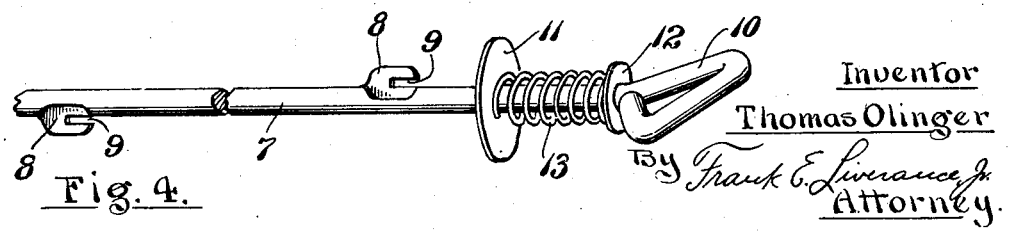
Fig. 4 is a fragmentary perspective view of the damper pin or rod.

The damper pin or rod 7 is pointed at one end and at spaced apart points in its length, equal to the distance that the openings 3 are located from each other in the disk 1, portions 8 are swaged from the rod extending outwardly therefrom in opposite directions and each is provided with an under-cut slot 9, as shown in Fig. 4, whereby hooks are made at spaced apart points in the length of the rod and on opposite sides thereof but extending in the same direction. The other end of the rod is formed into a handle 10. Two disks 11 and 12 are mounted on the rod, the disk 12 lying against the handle and a coiled spring 13 being disposed between the disks 11 and 12.

Figure 1:
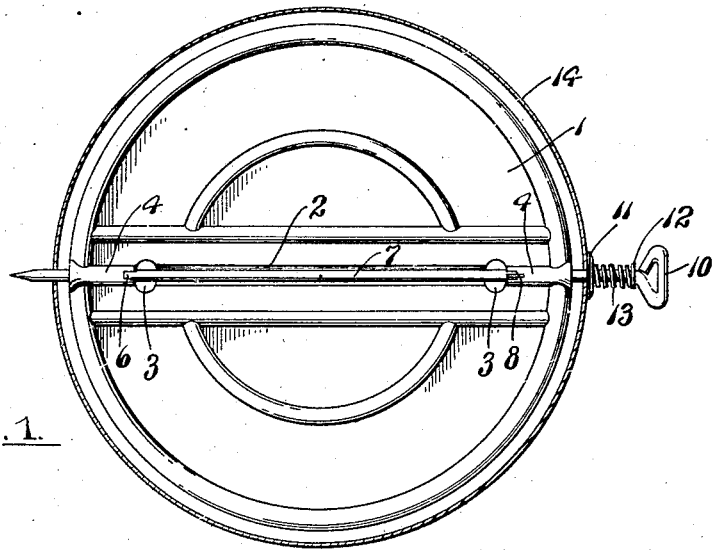
Figure 2:
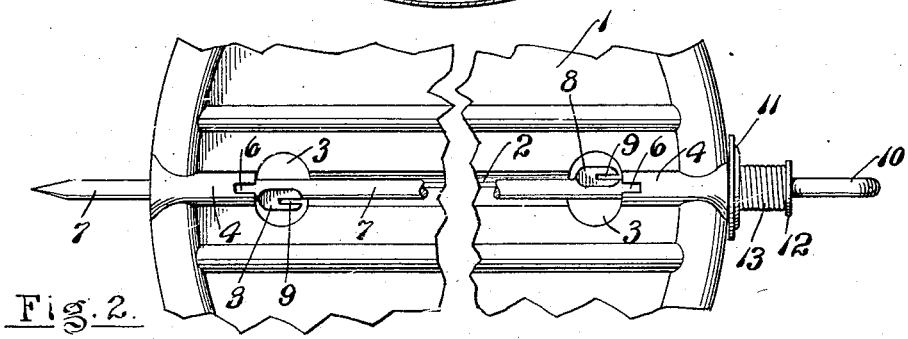
Fig. 2 is a fragmentary elevation of the damper disk illustrating the manner in which the damper pin or rod is assembled therewith.

In the assembly of the damper with a furnace pipe, indicated at 14, the damper disk is placed within the pipe with the grooves 2 and 4 in substantial alignment with the openings which are made in diametrically opposed sides of the pipe for the passage of the damper pin. This pin may be inserted from either side of the pipe, passing through the openings in the pipe and lying in the grooves 2 and 4 of said damper disk. When thus inserted the disk 11 comes against a side of the pipe 14 and the spring 13 is compressed, the hook portions 8 coming to the openings 3 in the damper disk, whereupon the pin may be turned so that the slots 9 are in alignment with one of the slots 5 and 6 in the ends of the grooved portions 2 and 4. Spring 13, when the pin is released, pulls the pin back so that the hook portions 8 engage with one of the grooved portions 4 and with the grooved portion 2 as shown in Fig. 1. If the pin is inserted from the opposite side the opposite grooved section 4 is engaged by the hook member 8 and the opposite end of the groove 2 is engaged by the other hook member 8 as is obvious.

It is evident that the damper disk may be very quickly and readily formed from a circular plate of sheet metal and that the damper pin is also very quickly and easily formed, the cost of manufacturing of both elements of the construction being very low. The complete reversibility of the damper pin is a feature of value in the installation of the dampers in the pipes, there being no necessity to guard or watch from which side of the pipe the damper pin is inserted.

The invention is defined in the appended claims and is to be considered as comprehensive of all forms of structure coming within their scope.

I claim:

1. In a damper, a damper disk having an opening cut therethrough a distance from each side thereof, and formed with a groove pressed therein on a diameter of the disk between said openings, said disk between the opposite side of each opening and the adjacent edge of the disk being formed with a groove extending oppositely from the first groove, each of the last mentioned grooves, at its inner end having a slot cut therein for a short distance, and said first groove having a slot cut in each end, all of the slots lying in longitudinal alinement.

2. A damper pin comprising an elongated rod formed at spaced apart points in its length and on opposite sides thereof with portions swaged therefrom and flattened and extended outwardly from the rod, each of said swaged portions being provided with a slot cut therein from one end parallel to the rod whereby hooks are made on opposite sides of the rod extending in the same direction.

3. In a damper, a damper disk having two openings cut therethrough, one a short distance from diametrically opposite sides of said disk, said disk, on a diameter thereof between said openings being formed with an outwardly pressed groove having a slot cut in each end thereof, and on the same diameter of the disk between the outer side of each opening and the adjacent edge of the disk being formed with a groove pressed outwardly in the opposite direction, each of the last mentioned grooves being formed with a slot in its inner end, all of the slots lying in longitudinal alinement, and a damper pin adapted to pass through said grooves from either side of the disk and formed at two spaced apart points, separated from each other substantially the distance that the openings in said disk are from each other, and on opposite sides thereof, with hook members extending in the same direction to engage with one end of the first groove at the slot in said end thereof, and with the inner end of one of the second mentioned grooves at the slot therein, thereby detachably connecting the disk and damper pin together.

4. A construction containing the elements in combination defined in claim 3, said hook portions on said pin being formed integrally with said pin and extending outwardly therefrom.

In testimony whereof I affix my signature.

THOMAS OLINGER.